United States Patent
Flynn et al.

(10) Patent No.: US 7,115,157 B2
(45) Date of Patent: Oct. 3, 2006

(54) GAS SEPARATION APPARATUS AND METHODS

(75) Inventors: Harry Eugene Flynn, Edmond, OK (US); Robert O. Martin, Edmond, OK (US); Charles A. Nataile, Edmond, OK (US)

(73) Assignee: Tronox, LLC, Oklahoma City, OK (US)

( * ) Notice: Subject to any disclaimer, the term of this patent is extended or adjusted under 35 U.S.C. 154(b) by 253 days.

(21) Appl. No.: 10/789,212

(22) Filed: Feb. 27, 2004

(65) Prior Publication Data

US 2005/0188852 A1  Sep. 1, 2005

(51) Int. Cl.
  *B01D 35/01* (2006.01)
  *B01D 45/12* (2006.01)
(52) U.S. Cl. .......................... 95/271; 55/459.1; 55/466; 96/188; 96/372
(58) Field of Classification Search ................. 55/435, 55/338, 459.1, 466; 96/372, 188, 189, 190; 95/269, 271
See application file for complete search history.

(56) References Cited

U.S. PATENT DOCUMENTS

| | | | |
|---|---|---|---|
| 1,856,685 A | 5/1932 | Anderson | |
| 2,788,087 A | 4/1957 | Lenehan | |
| 3,816,383 A | 6/1974 | Stotko | |
| 5,188,237 A * | 2/1993 | Schwamborn | ............... 209/23 |
| 6,399,033 B1 | 6/2002 | Hartmann | .................... 423/74 |
| 2003/0150330 A1 | 8/2003 | Hotta et al. | |

* cited by examiner

Primary Examiner—Robert A. Hopkins
(74) Attorney, Agent, or Firm—Guerin & Rodriguez, LLP; Stanley K. Hill

(57) ABSTRACT

Novel gas separation apparatus and methods are provided that help reduce the amount of process gas lost through the discharge outlet of either a cyclone separating gas/solid mixtures or a hydroclone separating gas/liquid mixtures. Significant savings are realized by minimizing losses and neutralization costs. A cyclone or hydroclone is placed within a containment vessel that creates a contained atmosphere common to both the gas outlet and the discharge outlet of the cyclone or hydroclone. Process gas mixed with the solids or mixed with the liquids in the discharge underflow are displaced from the discharge underflow and contained within the containment vessel. The displacement of the process gas is facilitated by an introduction of a small amount of purge gas to the discharge underflow exiting the cyclone or hydroclone via the discharge outlet. The mixture of displaced process gas and purge gas migrates to the top of the containment vessel where it is merged with the gas overflow exiting the cyclone or hydroclone via the gas outlet.

11 Claims, 2 Drawing Sheets

GAS SEPARATION APPARATUS AND METHODS

FIELD OF THE INVENTION

The present invention generally relates to the separation of gas from a gas/solid mixture or a gas/liquid mixture. More specifically, the present invention relates to novel separation apparatus and methods useful for separating gas from a gas/solid mixture or gas from a gas/liquid mixture more efficiently than can be done with apparatus and methods of the prior art.

BACKGROUND OF THE INVENTION

Cyclone separators ("cyclones") comprise well known means for separating gases and solids from mixtures of the same. Cyclones generally are constructed of a tubular or cylindrical-shaped main body connected to a lower tapered conical portion. A tangential side inlet is provided near the top of the cylindrical main body. A gas outlet tube is provided and generally extends downwardly through the cyclone top into the main body of the cyclone. The tube usually must extend down to a level slightly below the lowest portion of the inlet to assure separation of solids and gases.

In operation, solids-laden gases are introduced at high velocity through the tangential inlet. The solids, which are heavier than the gases, are thrown against the walls of the cyclone by centrifugal force. Gravity then causes the solids to fall toward the bottom of the cyclone. The separated gas follows a vortex path upwardly and passes out of the top of the cyclone through a gas outlet. The gas stream passing out of the top of the cyclone is commonly referred to as the gas overflow. The separated solids exit the cyclone through a solids outlet (also commonly referred to as a discharge outlet) at the base of the tapered conical section. These separated solids are typically referred to as cyclone dust, waste solids, or the discharge underflow.

One example where cyclones are used to separate gas from a gas/solid mixture is in the production of titanium dioxide ("$TiO_2$"). The chloride method for producing $TiO_2$ involves first producing titanium tetrachloride ("$TiCl_4$") via the chlorination of titanium values in a titanium-containing starting material and then reacting the $TiCl_4$ with oxygen to produce a gas/solid mixture comprising chlorine gas and particulate $TiO_2$. Typically, the $TiO_2$ product is recovered from the gas/solid mixture using a cyclone and the gas is typically recycled back into the process and used to chlorinate additional titanium-containing values in the titanium-containing starting material to produce $TiCl_4$.

The separation of gas from a gas/solid mixture by a cyclone is not 100 percent efficient. Generally, the gas exiting through the gas outlet will carry some solids with it and the solids exiting the cyclone through the solids outlet will be accompanied by some gas as well. The solids exiting the cyclone through the gas outlet are typically filtered out by mechanical means. Typically, the gas exiting the cyclone through the solids outlet must be allowed to escape from the solids or, if that is not an acceptable solution, a means of scrubbing or neutralizing the gas must be employed. If the gas is the desired product, then gas exiting the cyclone through the solids outlet represents an undesirable yield loss in the process. If the gas is intended to be recycled from the gas outlet to the particular process giving rise to the gas/solids mixture (as is the case with chlorine gas in the chloride method described above for producing $TiO_2$), then gas exiting the cyclone through the solids outlet must be replaced as it is lost.

SUMMARY OF THE INVENTION

The present invention reduces the amount of process gas lost through the discharge outlet of either a cyclone separating gas/solid mixtures or a hydroclone separating gas/liquid mixtures. Significant savings are realized by minimizing losses and neutralization costs. The present invention provides for novel gas separation apparatus and methods. In accordance with the present invention, a cyclone or hydroclone is placed within a containment vessel that creates a contained atmosphere common to both the gas outlet and the discharge outlet. Process gas mixed with the solids or mixed with the liquids in the discharge underflow are displaced from the discharge underflow and contained within the containment vessel. The displacement of the process gas is facilitated by an introduction of a small amount of purge gas to the discharge underflow exiting the cyclone or hydroclone via the discharge outlet. The mixture of displaced process gas and purge gas migrates to the top of the containment vessel where it is merged with the gas overflow exiting the cyclone or hydroclone via the gas outlet.

DESCRIPTION OF THE DRAWING

The present invention is illustrated by way of example in the following drawing in which like references indicate similar elements.

DETAILED DESCRIPTION OF PREFERRED EMBODIMENTS OF THE INVENTION

Figure 1:
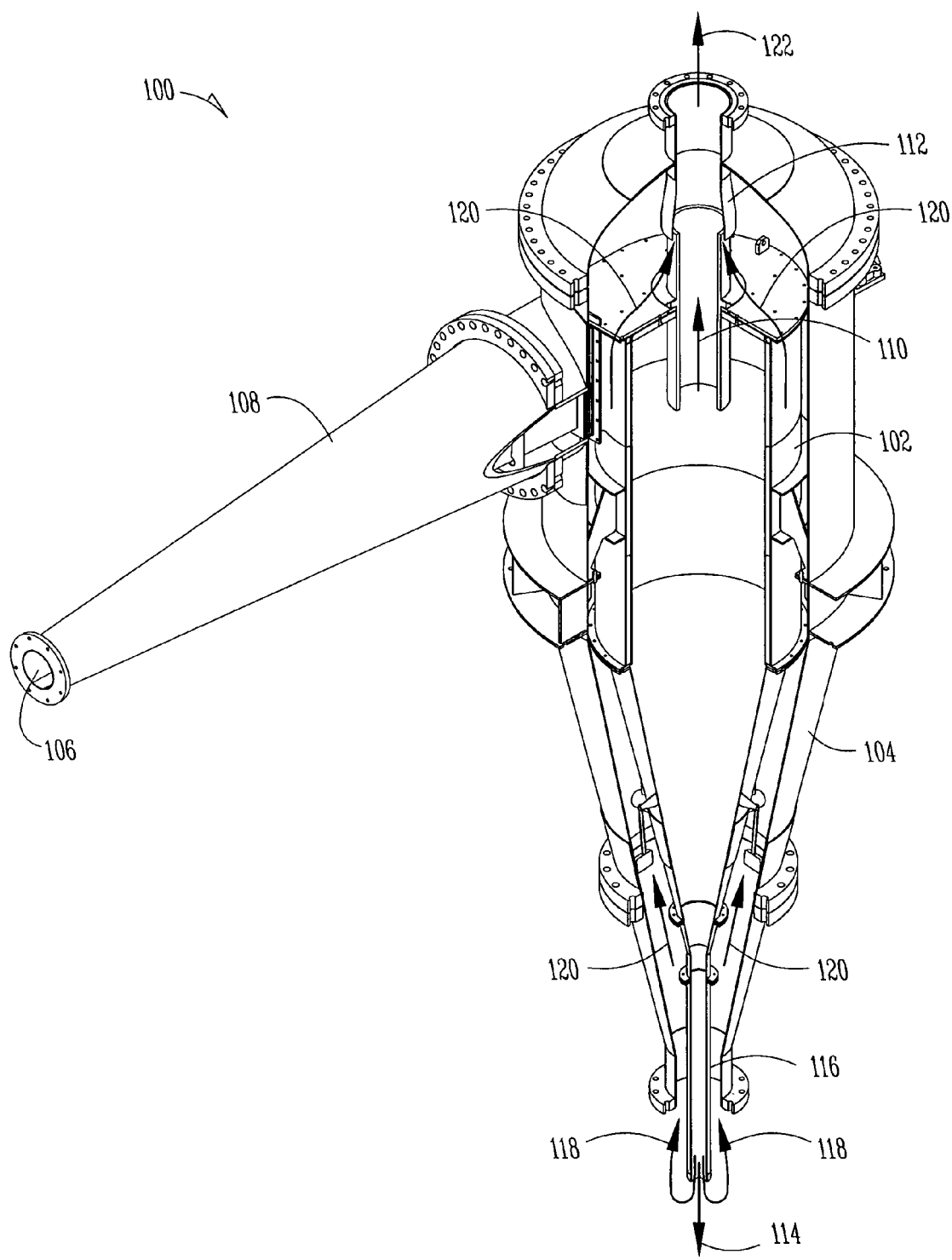
FIG. 1 illustrates a cross-sectional view of a gas separation apparatus according to the present invention.

In the following detailed description of preferred embodiments of the present invention, reference is made to the accompanying Drawing, which forms a part hereof, and in which is shown by way of illustration a specific embodiment in which the present invention may be practiced. It should be understood that other embodiments may be utilized and changes may be made without departing from the scope of the present invention.

The present invention concerns a novel gas separation apparatus that returns process gas from the discharge outlet of a cyclone or hydroclone to the gas outlet of the cyclone or hydroclone and so reduces the amount of process gas otherwise lost through the discharge outlet of the cyclone or hydroclone. In accordance with the present invention, a cyclone or hydroclone is positioned within a containment vessel, with the containment vessel creating a contained atmosphere common to both the gas outlet and the discharge outlet. Typically, the containment vessel is a pressurized vessel. The cyclone or hydroclone is not required to be pressurized. The containment vessel is in communication with the gas outlet and with the discharge outlet of the cyclone or hydroclone. By this, it is meant that there exists sufficient space between the inner wall of the containment vessel and the outer wall of the cyclone or hydroclone to allow gas to travel from the discharge outlet to the gas outlet. During operation of the cyclone or hydroclone, process gas is displaced from the discharge underflow and contained within the containment vessel. The displacement of the process gas from the discharge underflow is facilitated by the introduction of a purge gas stream to the discharge underflow exiting via the discharge outlet. The purge gas stream is in communication with the discharge outlet and in communication with the containment vessel. By this, it is meant that the purge gas stream is introduced to the discharge underflow exiting the discharge outlet and the mixture of purge gas and displaced process gas can enter the containment vessel. The mixture of purge gas and displaced process gas migrates to the top of the containment vessel where it is merged with the gas overflow exiting via the gas outlet. Because the amount of purge gas and the amount of displaced process gas is small relative to the volume of the containment vessel, the gas velocity inside the containment vessel is low. The purge gas flow is generally countercurrent to the discharge underflow and the flow is not so large as to re-entrain solids or liquids into the gas stream.

In a first embodiment, a cyclone separator is used to separate gas and solids from a gas/solid mixture, for example, as produced during the production of $TiO_2$. Solids-laden process gas (that is, a gas/solid mixture) is introduced at high velocity through a tangential inlet. The solids, which are heavier than the gas, are thrown against the walls of the cyclone by centrifugal force. Gravity then causes the solids to fall toward the bottom of the cyclone. The separated process gas (that is, the gas overflow) follows a vortex path upwardly and passes out of the top of the cyclone through the gas outlet. The separated solids (that is, the discharge underflow) flow through the discharge outlet at the base of the tapered conical section of the cyclone. Generally, the discharge underflow has a majority portion of solids and a minority portion of process gas.

Turning now to the Drawing, FIG. 1 shows a cross-sectional view of a gas separation apparatus 100 in accordance with the present invention. The gas separation apparatus 100 comprises a cyclone 102 positioned inside a containment vessel 104. In operation, solids-laden process gas 106 enters the cyclone 102 at high velocity through a tangential inlet 108. The solids, which are heavier than the gas, are thrown against the walls of the cyclone 102 (initially in the cylindrical-shaped main body portion) by centrifugal force. Gravity then causes the solids to fall toward the bottom of the cyclone 102. The separated gas 110 (that is, the gas overflow) follows a vortex path upwardly and passes out of the top of the gas separation chamber 102 through a gas outlet 112. The separated solids 114 (that is, the discharge underflow) flow through a discharge outlet 116 at the base of the tapered conical section.

A purge gas stream 118 is introduced to the discharge underflow 114 as the discharge underflow 114 exits the gas separation chamber 102 via the discharge outlet 116. The introduction of the purge gas stream 118 to the discharge underflow 114 causes displacement of process gas from the discharge underflow 114. The displaced process gas mixes with the purge gas and the gaseous mixture 120 migrates up through the containment vessel 104 surrounding cyclone 102. In this manner, the purge gas stream is said to be in communication with the containment vessel 104 and in communication with the discharge outlet 116 through which the discharge underflow 114 exits the cyclone 102. The cyclone 102 is positioned inside the containment vessel 104 in a manner that leaves sufficient space between the gas separation chamber 102 and the containment vessel 104 to allow the passage of the gaseous mixture 120. The gaseous mixture 120 of purge gas and displaced process gas migrates to the top of the containment vessel 104 where it is merged with the gas overflow 110 exiting the cyclone 102 via the gas outlet 112. The gaseous mixture 120 passes through one or more gaps in the gas outlet 112 and is thereby merged with the gas overflow 110, forming a second gaseous mixture 122 that exits the gas separation apparatus 100 via the gas outlet 112.

Figure 2:
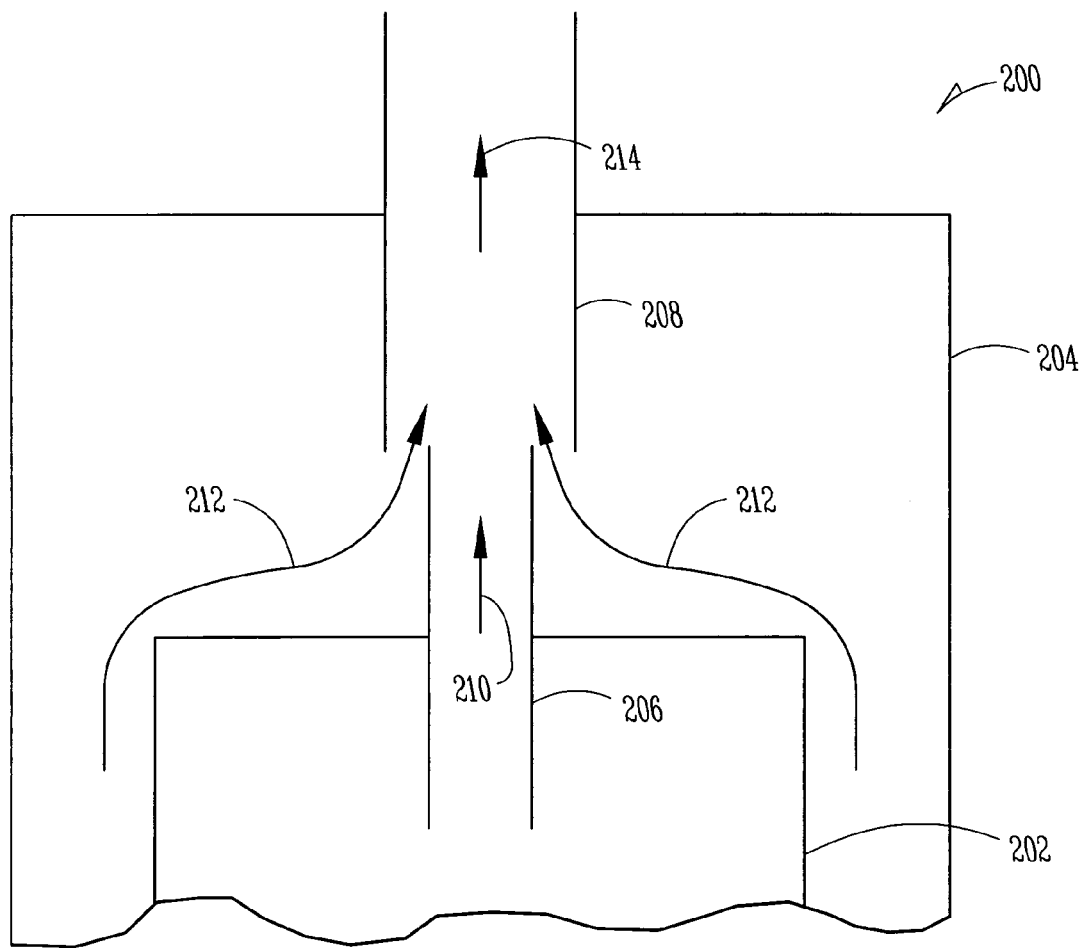
FIG. 2 illustrates the upper portion of a gas separation apparatus according to the present invention.

The gaps in the gas outlet can be formed by overlapping pipe sections as shown in FIG. 2. FIG. 2 illustrates the upper portion of a gas separation apparatus 200 of the present invention. The gas separation apparatus 200 comprises a cyclone 202, a containment vessel 204, a first gas outlet section 206, and a second gas outlet section 208. The second gas outlet section 208 and the first gas outlet section 206 overlap in a manner to produce one or more gaps between the two sections. Process gas 210 from the cyclone 202 moves up through the first gas outlet section 206 and into the second gas outlet section 208. The mixture 212 of purge gas and process gas migrates up through the containment vessel 204 and enters the second gas outlet section 208 through the one or more gaps between the two gas outlet sections. Both the process gas 210 from the cyclone and the mixture 212 from the containment vessel continue up through the second gas outlet section 208 in the direction indicated 214.

In a second embodiment, the device 102 is a hydroclone separator and the gas separation apparatus 100 is employed to separate process gas from a gas/liquid mixture. According to this second embodiment, a gas/liquid mixture is introduced at high velocity through a tangential inlet. The liquid, which is heavier than the gas, is thrown against the walls of the hydroclone (initially in its cylindrical main body) by centrifugal force. Gravity then causes the liquid to fall to the bottom of the hydroclone. The separated process gas (that is, the gas overflow) follows a vortex path upwardly and passes out of the top of the apparatus 100 through the gas outlet. The separated liquid (that is, the discharge underflow) flows through the discharge outlet at the base of the tapered conical section of the hydroclone. Generally, the discharge underflow has a majority portion of liquid and a minority portion of process gas. Just as in the first embodiment described above, a purge gas stream is introduced to the discharge underflow to help displace process gas from the discharge underflow and the mixture of purge gas and displaced process gas is allowed to migrate up through the containment vessel and is merged with the gas overflow.

In one preferred embodiment, a gas separation apparatus is used to separate chlorine gas from $TiO_2$ particles. A substantial reduction in the loss of recycled chlorine gas can be obtained. In this preferred embodiment, preferred purge gases include nitrogen and carbon dioxide.

The particular purge gas utilized may depend on the particular application of the present invention. Criteria to be considered when choosing a purge gas might include process impact, corrosion issues, costs, etc. For example, one might choose a purge gas that allows the gas mixture exiting the cyclone or hydroclone through the gas outlet to be recycled without having to first separate the purge gas from the mixture.

The present invention provides for more complete separation of process gases from either a gas/solid mixture or a gas/liquid mixture. While the present invention has been described in detail with respect to specific embodiments thereof, it will be appreciated that those skilled in the art, upon attaining an understanding of the foregoing, may readily conceive of alterations to, variations of and equivalents to these embodiments. Accordingly, the scope of the present invention should be assessed as that of the appended claims and by equivalents thereto.

What is claimed is:

1. A gas separation apparatus, comprising:
   a cyclone or hydroclone having a gas outlet and a discharge outlet;
   a containment vessel in communication with the gas outlet and in communication with the discharge outlet; and
   a purge gas stream in communication with the discharge outlet and in communication with the containment vessel.

2. The apparatus of claim 1, wherein the gas separation chamber is a cyclone adapted for the separation of gas from a gas/solid mixture.

3. The apparatus of claim 1, wherein the gas separation chamber is a hydroclone adapted for the separation of gas from a gas/liquid mixture.

4. The apparatus of claim 1, wherein the containment vessel is pressurized.

5. A method for separating gas from a first gas/solid or gas/liquid mixture, comprising the steps of:
   introducing the first gas/solid or gas/liquid mixture into a cyclone or hydroclone, respectively;
   separating the first mixture into a gas overflow and a discharge underflow;
   introducing a purge gas stream to the discharge underflow to create a second mixture comprising purge gas and gas displaced from the discharge underflow; and
   merging the second mixture with the gas overflow.

6. The method of claim 5, wherein the first mixture is a gas/solid mixture.

7. The method of claim 5, wherein the gas is chlorine and the solid is titanium dioxide.

8. The method of claim 5, wherein the first mixture is a gas/liquid mixture.

9. The method of claim 6, wherein the discharge underflow comprises a majority portion of solids and a minority portion of gas.

10. The method of claim 8, wherein the discharge underflow comprises a majority portion of liquid and a minority portion of gas.

11. The method of claim 5, wherein the purge gas is nitrogen or carbon dioxide.

* * * * *